United States Patent
Tejeda et al.

(10) Patent No.: US 10,094,704 B2
(45) Date of Patent: Oct. 9, 2018

(54) SYSTEM FOR ESTIMATING A MASS OF A PAYLOAD IN A HAULING MACHINE

(71) Applicant: Caterpillar Inc., Peoria, IL (US)

(72) Inventors: Balmes Tejeda, Peoria, IL (US); Amit Jayachandran, Peoria, IL (US); James W. Landes, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 323 days.

(21) Appl. No.: 14/928,571

(22) Filed: Oct. 30, 2015

(65) Prior Publication Data

US 2017/0122792 A1   May 4, 2017

(51) Int. Cl.
| | |
|---|---|
| *G01G 19/12* | (2006.01) |
| *G01G 19/414* | (2006.01) |
| *G07C 5/08* | (2006.01) |
| *B60P 1/04* | (2006.01) |

(52) U.S. Cl.
CPC ........... *G01G 19/12* (2013.01); *G01G 19/414* (2013.01); *G07C 5/0808* (2013.01); *B60P 1/04* (2013.01)

(58) Field of Classification Search
CPC .... G01G 19/12; G01G 19/414; G07C 5/0808; B60P 1/04
See application file for complete search history.

(56) References Cited

U.S. PATENT DOCUMENTS

| | | | |
|---|---|---|---|
| 4,863,337 A | 9/1989 | Ishiguro et al. | |
| 5,327,347 A | 7/1994 | Hagenbuch | |
| 5,391,843 A | 2/1995 | Sato et al. | |
| 7,039,519 B2 | 5/2006 | Ishiguro et al. | |
| 7,878,751 B2 | 2/2011 | Hagenbuch | |
| 8,452,504 B2 | 5/2013 | Dickinson | |
| 8,630,767 B2 | 1/2014 | Karlsson et al. | |
| 2007/0131471 A1 | 6/2007 | Ehmanns et al. | |
| 2009/0045017 A1 | 2/2009 | Joergensen et al. | |
| 2009/0099886 A1 | 4/2009 | Greiner et al. | |
| 2009/0293322 A1 | 12/2009 | Faivre et al. | |
| 2012/0274121 A1 | 11/2012 | Minoshima et al. | |
| 2014/0081530 A1* | 3/2014 | Hu | B60P 1/283 701/50 |
| 2014/0324302 A1* | 10/2014 | Tejeda | G01G 19/086 701/51 |

(Continued)

FOREIGN PATENT DOCUMENTS

| | | |
|---|---|---|
| DE | 102010003921 A1 | 10/2011 |
| EP | 0356067 A2 | 2/1990 |

(Continued)

*Primary Examiner* — Manuel L Barbee
(74) *Attorney, Agent, or Firm* — Leydig, Voit & Mayer, LTD.

(57) ABSTRACT

A system for estimating a payload includes a torque sensor, a grade detector, and a machine acceleration sensor. A controller compares the angle of inclination to its threshold, compares the rate of change in the angle of inclination to its threshold, and compares the machine acceleration to its threshold. An estimate of the payload is determined based upon the output torque from the prime mover, the angle of inclination of the machine, and the unloaded mass but only if the angle of inclination of the machine is greater than the angle of inclination threshold, the rate of change in the angle of inclination is less than the inclination rate of change threshold, and the machine acceleration is less than the acceleration threshold.

20 Claims, 7 Drawing Sheets

(56) References Cited

U.S. PATENT DOCUMENTS

2015/0127229 A1  5/2015  Goraya et al.

FOREIGN PATENT DOCUMENTS

| EP | 0695930 B1 | 2/1996 |
| EP | 2073991 | 9/2013 |
| EP | 2489539 | 9/2013 |
| JP | 2006-336390 A | 12/2006 |
| WO | WO 2009/008784 A1 | 1/2009 |
| WO | WO 2012/082019 A1 | 6/2012 |
| WO | WO 2012/169358 A1 | 12/2012 |

* cited by examiner

SYSTEM FOR ESTIMATING A MASS OF A PAYLOAD IN A HAULING MACHINE

TECHNICAL FIELD

This patent disclosure relates generally to payload hauling machines, and, more particularly to methods of estimating the mass of a payload carried by a payload hauling machine.

BACKGROUND

Hauling machines are utilized in various industries to transport a payload from one location to another. In order to operate such machines efficiently, it is desirable to carry an optimally sized payload. Loading a machine to less than full capacity may result in excess costs associated with unnecessary runs and the acceleration of maintenance schedules. Overloading a machine may result in increased wear and costly maintenance.

Numerous methods have been proposed for determining the mass of payloads in hauling machines. While physically weighing a machine on a scale and then deducting the weight of the machine itself may be a reliable method of measuring a payload, such an arrangement is not practical in large machines. Moreover, physically weighing a machine is generally not possible in the field.

European Patent Application Publication 0 356 067 to Kirby discloses a method of calculating the mass of a vehicle by utilizing the equation weight is equal to force divided by acceleration, that is, W=f/a, adjusted based upon calculations utilized to obtain the values for force and acceleration. Kirby proposes the measurement of acceleration based upon an inertial accelerometer, by measurements associated with a braking mechanism, or by the deformation or twisting of a drive train member measured by magnetic markers mounted on a propeller shaft of a road vehicle. The twisting of the shaft results in a delay between signals from the markers, where the time interval is proportional to the accelerating force. Kirby further proposes that force be determined from a sensor arrangement in conjunction with a time signal from a speedometer arrangement where the machine is traveling on a level ground at a constant acceleration between two speeds. Kirby indicates that resulting constants in the calculation may be evaluated in a known weight machine and eliminated by calibration such that weight of the vehicle may be calculated using the above equation.

SUMMARY

In one aspect, a system for estimating a payload of a bed of a machine, includes a torque sensor for determining an output torque from a prime mover, a grade detector for determining an angle of inclination of the machine, a sensor for determining machine acceleration, and a controller. The controller is configured to store an angle of inclination threshold, store an inclination rate of change threshold, store an acceleration threshold, and store an unloaded mass of the machine in an unloaded condition. The controller is further configured to determine the output torque from the prime mover, determine the angle of inclination of the machine based upon signals from the grade detector, compare the angle of inclination of the machine to the angle of inclination threshold, determine a rate of change in the angle of inclination, compare the rate of change in the angle of inclination to the inclination rate of change threshold, determine the machine acceleration, and compare the machine acceleration to the acceleration threshold. The controller is also configured to determine an estimate of the payload in the bed based upon the output torque from the prime mover, the angle of inclination of the machine, and the unloaded mass but only if: a) the angle of inclination of the machine is greater than the angle of inclination threshold; b) the rate of change in the angle of inclination is less than the inclination rate of change threshold; and c) the machine acceleration is less than the acceleration threshold.

In another aspect, a method of estimating a payload of a bed of a machine includes storing an angle of inclination threshold, storing an inclination rate of change threshold, storing an acceleration threshold, and storing an unloaded mass of the machine in an unloaded condition. The method further includes determining an output torque from a prime mover, determining an angle of inclination of the machine based upon signals from a grade detector, comparing the angle of inclination of the machine to the angle of inclination threshold, determining a rate of change in the angle of inclination, and comparing the rate of change in the angle of inclination to the inclination rate of change threshold. The method still further includes determining a rate of machine acceleration, and comparing the rate of machine acceleration to the acceleration threshold. The method also includes determining an estimate of the payload in the bed based upon the output torque from the prime mover, the angle of inclination of the machine, and the unloaded mass but only if: a) the angle of inclination of the machine is greater than the angle of inclination threshold; b) the rate of change in the angle of inclination is less than the inclination rate of change threshold; and c) the machine acceleration is less than the acceleration threshold.

In still another aspect, a hauling machine includes a plurality of ground engaging elements, a prime mover operatively connected to the plurality of ground engaging elements, a bed adapted to carry a payload, a transmission operatively connected to the prime mover and the plurality of ground engaging elements and adapted to operate in a plurality of gears, a torque sensor for determining an output torque from a prime mover, a grade detector for determining an angle of inclination of the machine, a sensor for determining machine acceleration, and a controller. The controller is configured to store an angle of inclination threshold, store an inclination rate of change threshold, store an acceleration threshold, and store an unloaded mass of the machine in an unloaded condition. The controller is further configured to determine the output torque from the prime mover, determine the angle of inclination of the machine based upon signals from the grade detector, compare the angle of inclination of the machine to the angle of inclination threshold, determine a rate of change in the angle of inclination, compare the rate of change in the angle of inclination to the inclination rate of change threshold, and determine the machine acceleration, compare the machine acceleration to the acceleration threshold. The controller is also configured to determine an estimate of the payload in the bed based upon the output torque from the prime mover, the angle of inclination of the machine, and the unloaded mass but only if: a) the angle of inclination of the machine is greater than the angle of inclination threshold; b) the rate of change in the angle of inclination is less than the inclination rate of change threshold; and c) the machine acceleration is less than the acceleration threshold.

DETAILED DESCRIPTION

Figure 1:
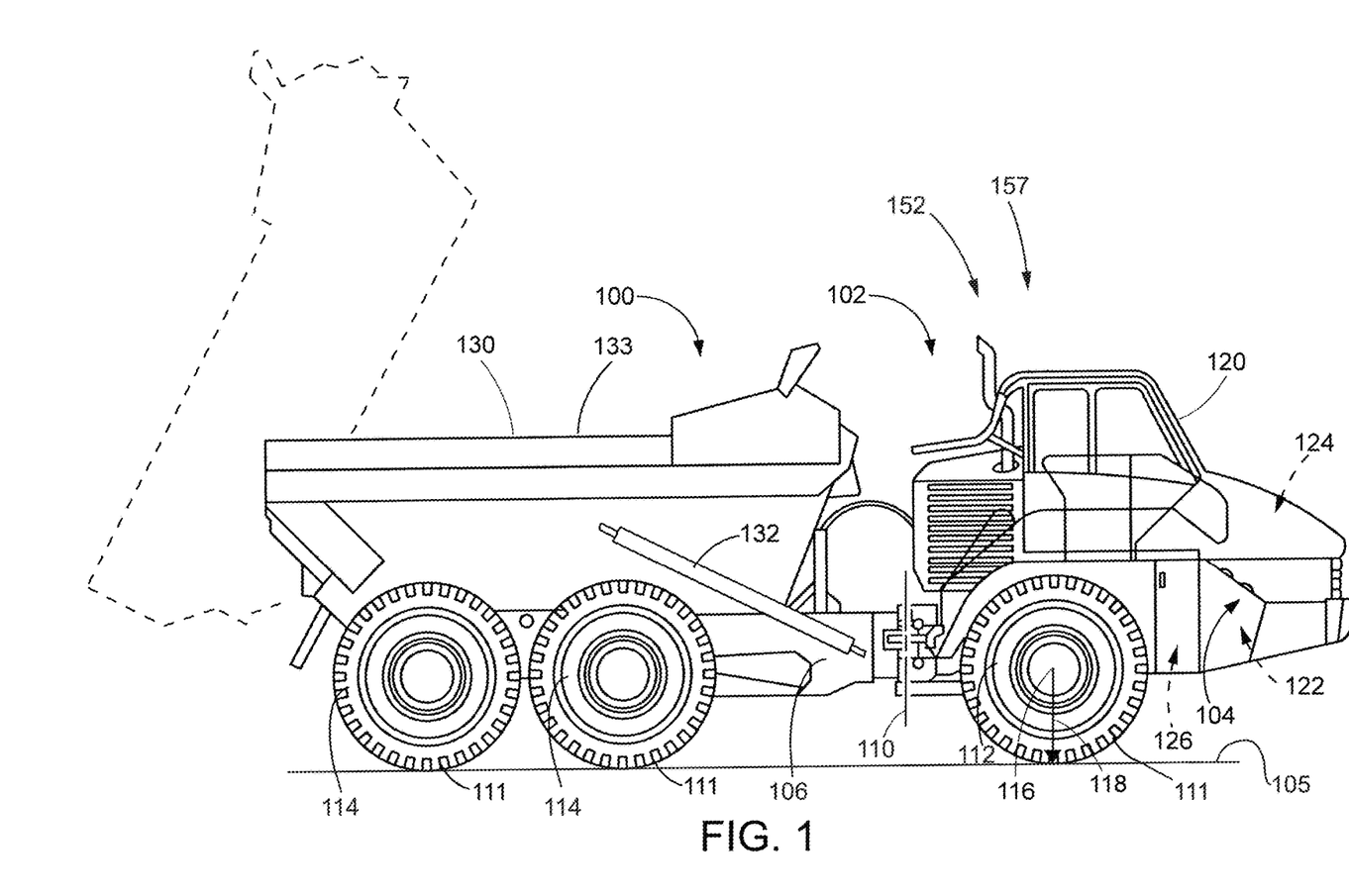
FIG. 1 is a diagrammatic side elevational view of an articulated truck which is illustrated as one example of a machine suitable for incorporating a system for estimating the mass of a payload in accordance with the disclosure.

This disclosure relates to hauling machines and the determination of the mass of a carried payload. FIG. 1 provides a schematic side elevational view of one example of a machine 100 incorporating a machine payload estimation system depicted generally at 500 according to the disclosure. In the illustration of FIG. 1, the machine 100 is an articulated truck, which is one example to illustrate the concepts of the described machine payload estimation system. The term "machine" refers to any machine that performs some type of operation associated with an industry such as mining, construction, farming, transportation, or any other industry known in the art. For example, machine 100 may be a dump truck, or any other machine for carrying a load of material, backhoe, grader, material handler or the like.

Referring to FIG. 1, the illustrated machine 100 is an articulated truck 102 that includes a front frame portion 104 and a rear frame portion 106 coupled at an articulation axis 110, and supported on a plurality of ground engaging elements 111, such as front wheels 112 and rear wheels 114. The front frame portion 104 may support a cab 120 and a drive system depicted generally at 122. The drive system 122 may include a prime mover such as an internal combustion engine, depicted generally at 124, configured to transmit power to a transmission, depicted generally at 126, including a plurality of gears. The transmission 126 in turn may be configured to transmit power to the ground engaging elements 111 (e.g., front wheels 112) by way of axle 116 using any known means. The front wheel 112 has a radius 118, which corresponds to the rolling radius 118 of the driven wheel on a work surface 105 (e.g., the distance from the center of the driven front wheel 112 to the ground).

The rear frame portion 106 supports a dump body or bed 130. In the illustrated machine 100, the bed 130 may be selectively pivoted between a load position (illustrated) and an unload position (shown in phantom) by one or more hoist cylinders 132 in response to commands from operator hoist control 134 (see FIG. 2) which may be located in the cab 120. While an articulated truck 102 with a pivoted bed 130 is illustrated, aspects of this disclosure may apply to other load hauling machines including, for example, unarticulated machines, or machines including a bed that incorporates a dumping plate that may be actuated by one or more dump cylinders to similarly push a payload 133 contained in the bed 130.

Figure 2:
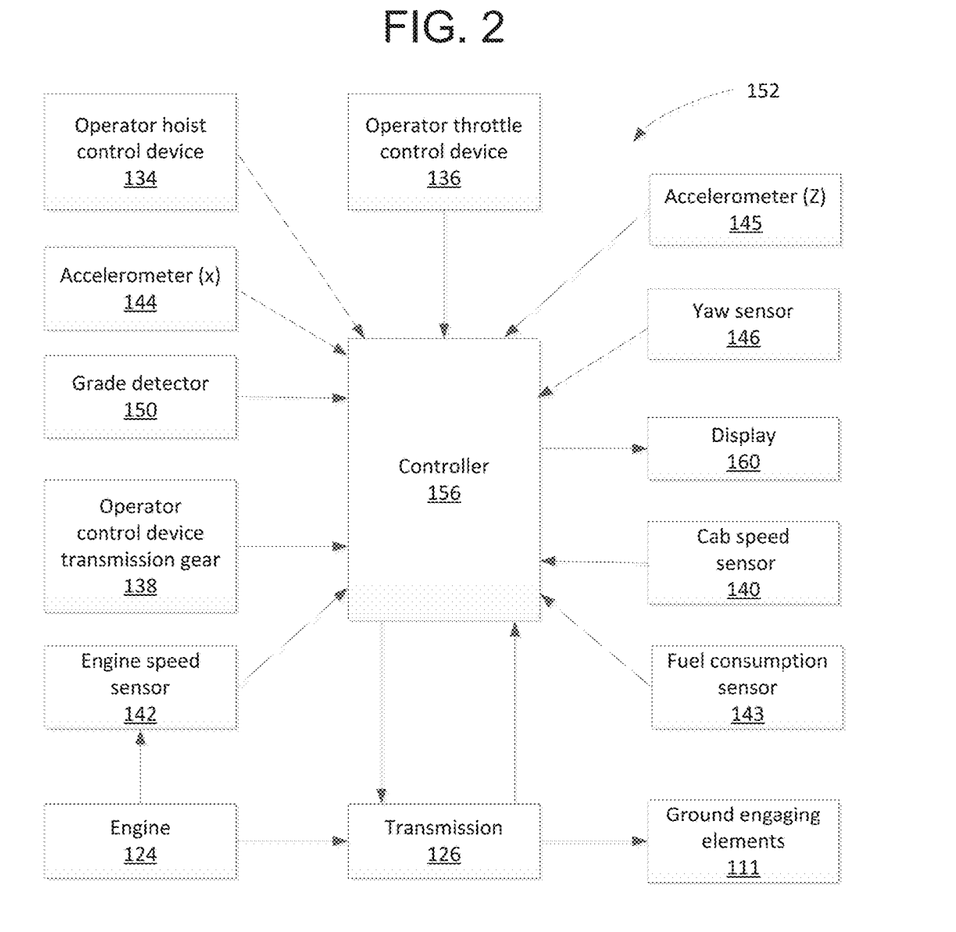
FIG. 2 is a block diagram of a controller and inputs to the controller for an exemplary machine.

A control system 152, as shown generally in FIG. 1, may be provided to control the operation of the machine 100. The control system 152 may include an electronic control module such as controller 156 (FIG. 2). The controller 156 may receive operator input command signals and control the operation of the various systems of the machine 10. The control system 152 may include one or more operator input devices to control the machine 10 and one or more sensors. The term "sensor" is meant to be used in its broadest sense to include one or more sensors and related components that may be associated with the machine 10 and that may cooperate to sense various functions, operations, and operating characteristics of the machine.

The controller 156 may be an electronic controller that operates in a logical fashion to perform operations, execute control algorithms, store and retrieve data and other desired operations. The controller 156 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 156 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 156 may be implemented in hardware and/or software without regard to the functionality. The controller 156 may rely on one or more data maps relating to the operating conditions of the machine 10 that may be stored in the memory of controller. Each of these maps may include a collection of data in the form of tables, graphs, and/or equations. The controller 156 may use the data maps to maximize the performance and efficiency of the machine 10.

Referring to FIG. 2, the machine 100 may include additional operator controls, such as a throttle 136, and a transmission gear control 138 by which an operator may choose a particular gear from a given selection of gears. Additional sensors may be associated with the operation of the machine 100, such as a cab speed sensor 140, engine speed sensor 142, fuel consumption sensor 143, accelerometer(s) associated with the fore and aft direction (X) 144 and the vertical direction (Z) 145, and/or yaw sensor 146. The combination of the engine speed sensor 142 and the fuel consumption sensor 143 may act as an equivalent of a torque sensor for generating torque signals indicative of an output torque from the engine 124. Still further sensors may be adapted to sense environmental characteristics of machine 100. For example, the machine 100 may include a tilt sensor, inclinometer, or grade detector 150. In some applications, signals from the accelerometer may be used to determine the grade upon which the machine 100 is operating. While each of these controls and sensors is illustrated diagrammatically in the block diagram in FIG. 2, the machine 100 may include additional, different, or fewer controls and sensors.

Control system 152 may include a payload estimation system 157 to provide an estimation of the mass of the payload 133 carried by the bed 130 of the machine 100. The payload estimation system 157 may determine an estimate of the payload during dynamic operation of the machine 100. For the purpose of this disclosure, the terms "dynamic operation" or "dynamic conditions" refer to operations and conditions wherein the machine 100 is moving as a result of operation of the drive system 122 to power ground engaging elements 111, such as the front wheels 112 and/or rear wheels 114.

The payload estimation system 157 may operate by analyzing the operating conditions of the machine 100 under certain environmental conditions. A dynamic model of the drive system of machine 100 may be expressed as:

$$F_{drive} - F_{losses} - F_{momentum} - F_{inertia} - F_{gravity} = 0 \qquad (1)$$

where $F_{drive}$ is the force at the engagement of the ground engaging elements 111 with the work surface 105, $F_{losses}$ are the forces lost within the drive system of the machine, $F_{inertia}$ is the change in force due to changes in inertia, $F_{momentum}$ is the change in force due to changes in momentum, and $F_{gravity}$ is the change in force due to the machine 100 moving uphill or downhill.

The force $F_{drive}$ at the engagement of the ground engaging elements 111 with the work surface 105 may be re-written as:

$$F_{drive} = T_{axle}/r_{wheel} \qquad (2)$$

where $T_{axle}$ is the torque at the axle 116 and $r_{wheel}$ is the radius of the drive wheel or ground engaging element 111 driving the machine 100.

The torque $T_{axle}$ at the axle 116 may be re-written as:

$$T_{axle} = T_{trans} \cdot \eta_{axle} \cdot R_{Axle} \qquad (3)$$

where $T_{trans}$ is the output torque of the transmission 126, $\eta_{axle}$ is the efficiency factor of the axle 116, and $R_{axle}$ is the gear ratio factor reflective of the gear ratio of the axle. In one example, the efficiency factor $\eta_{axle}$ of the axle 116 may be approximately 0.9-0.95. Substituting Equation (3) into Equation (2) results in:

$$F_{drive} = T_{trans} \cdot \eta_{axle} \cdot R_{Axle}/r_{wheel} \qquad (4)$$

The torque $T_{trans}$ at the transmission 126 may be re-written as:

$$T_{trans} = T_{engine} \cdot \eta_{trans} \cdot R_{trans} \qquad (5)$$

where $T_{engine}$ is the output torque of the engine 124, $\eta_{trans}$ is the efficiency factor of the transmission 126, and $R_{trans}$ is the gear ratio factor reflective of the gear ratio of the transmission. In one embodiment, the efficiency factor $\eta_{trans}$ of the transmission 126 may be approximately 0.9-0.95. In one example, the controller 156 may use the amount of fuel being used by the engine 124 together with the engine speed to determine the output torque $T_{engine}$ from the engine. Such determination may be made through the use of look-up tables, data maps, equations, or other aspects of the controller 156. Other manners of determining the output torque are contemplated. Substituting Equation (5) into Equation (4) results in:

$$F_{drive} = T_{engine} \cdot \eta_{trans} \cdot R_{trans} \cdot \eta_{axle} \cdot R_{axle}/r_{wheel} \qquad (6)$$

The forces $F_{losses}$ lost within the drive system of the machine 100 may include the rolling resistance at the ground engaging elements 111, drag or wind resistance on the machine, and other losses or friction within the drive system 122. In one example, the rolling resistance may be approximated as an increase in mass of 5%. In other examples, the rolling resistance may be calculated in other manners. The degree of accuracy used for the rolling resistance may be coupled to the desired accuracy of the payload estimation system 157. The drag on the machine 100 may typically be ignored as being negligible at the relatively low operating speeds of the machine. In some embodiments, friction within the axle 116, the engine 124, and the transmission 126 may be included as part of the forces $F_{losses}$ lost within the drive system 122. In other embodiments, the friction within the axle 116 may be included in the axle efficiency factor $\eta_{axle}$, the friction within the engine 124 may be included in the look-up tables, data maps, equations, and other information within the controller 156, and the friction within the transmission 126 may be included in the transmission efficiency factor $\eta_{trans}$.

The change in force $F_{momentum}$ due to changes in momentum of the machine 100 may include a change in momentum due to increases or decreases in the velocity of the machine.

The change in force $F_{inertia}$ due to changes in inertia of the machine 100 may include changes in inertia due to increases or decreases in the angular velocity of rotating components of the machine. Such rotating components may include the wheels or ground engaging elements 111, the axles 116, the drive shafts including those of the engine 124, and the transmission 126.

The change in force $F_{gravity}$ due to gravity may be expressed as:

$$F_{gravity} = m \cdot g \cdot \sin \theta \qquad (7)$$

where m is the mass of the machine 100 (which may be fully or partially loaded or empty), g is the acceleration of gravity, and θ is the angle of the work surface 105 along which machine 100 is traveling relative to a horizontal reference. The change in force $F_{gravity}$ is essentially the change in potential energy of the machine 100, with the potential energy increasing as the machine moves uphill and decreasing as the machine moves downhill.

By substituting Equations (6) and (7) into Equation (1), the dynamic model may be re-written as:

$$T_{engine} \cdot \eta_{trans} \cdot R_{trans} \cdot \eta_{axle} \cdot R_{Axle}/r_{wheel} - F_{losses} - F_{momentum} - F_{inertia} - m \cdot g \cdot \sin \theta = 0 \qquad (8)$$

The payload estimation system 157 may be configured to use Equation (8) only under certain operating conditions to determine an estimate of the total mass of the machine 100. More specifically, it has been determined that the accuracy of the calculation of the output torque $T_{engine}$ of the engine 124 is increased when the engine is operating at relatively high torque values. Such high torque values are achieved when the machine is operating at or relatively close to full throttle. High output torque $T_{engine}$ from engine 124 is typically associated with the acceleration of machine 100 as well as angular acceleration of its rotating components. Under many circumstances, the calculations of the force $F_{momentum}$ due to changes in momentum and the force $F_{inertia}$ due to changes in inertia are relatively complex, inaccurate, and/or require additional sensors on the machine 100.

By operating the payload estimation system 157 when the machine 100 is traveling at a relatively constant velocity, the force $F_{momentum}$ due to changes in momentum and the force $F_{inertia}$ due to changes in inertia are essentially zero and may be ignored. In other words, in order to simplify the payload estimation calculation, it is desirable to estimate the payload while operating at a constant velocity to eliminate the effect of changes in momentum and inertia. Under these circumstances, the force $F_{momentum}$ due to changes in momentum and the force $F_{inertia}$ due to changes in inertia may be approximated at zero and Equation (8) re-written as:

$$T_{engine} \cdot \eta_{trans} \cdot R_{trans} \cdot \eta_{axle} \cdot R_{axle}/r_{wheel} - F_{losses} - m \cdot g \cdot \sin \theta = 0 \qquad (9)$$

As stated above, to achieve high accuracy of the engine output torque $T_{engine}$, it is desirable for the payload estimation at a high engine output torque. To counteract the energy from the high output torque $T_{engine}$ from the engine 124 while maintaining the machine operation at a constant velocity, the payload estimation system 157 operates only when the machine 100 is moving uphill along a relatively constant and sufficiently steep slope. In such case, the slope of the work surface 105 compensates for the high torque by storing potential energy without the acceleration of the machine or rotating components thereof.

Equation (9) may be re-written in terms of the mass (m) of the machine 100 as follows:

$$m = (T_{engine} \cdot \eta_{trans} \cdot R_{trans} \cdot \eta_{axle} \cdot R_{axle}/r_{wheel} - F_{losses})/g \cdot \sin \theta \qquad (10)$$

From Equation (10), it may be seen that the mass (m) of the machine 100 is a function of the output torque $T_{engine}$ from the engine 124 and the angle θ of the work surface 105, both of which may be determined in a relatively simple manner. While the gear ratio of the transmission 126 may vary from one gear to the next, it is fixed for each gear.

Depending upon the desired accuracy of the payload estimation system 157, it may be possible to further simplify Equation (10) by either setting the friction losses $F_{losses}$ at a constant or even zero. For example, if the friction losses $F_{losses}$ are set at zero, Equation (10) may be further simplified to:

$$m = (T_{engine} \cdot \eta_{trans} \cdot R_{trans} \cdot \eta_{axle} \cdot R_{axle})/(r_{wheel} \cdot g \cdot \sin \theta) \qquad (11)$$

To determine the mass (m payload) payload) of the payload 133, the unloaded mass ($m_{unloaded}$) is subtracted from the total mass (m) of the machine 100 calculated in Equation (11) as follows:

$$m_{payload} = \frac{(T_{engine} \cdot \eta_{trans} \cdot R_{trans} \cdot \eta_{axle} \cdot R_{axle})}{(r_{wheel} \cdot g \cdot \sin\theta)} - m_{unloaded} \qquad (12)$$

Although the payload estimation system 157 is described as operating only when the machine is operating at a constant velocity while on a relatively steep and constant slope, the phrases constant velocity, constant slope, and relatively steep slope are not absolute but relative. More specifically, the closer each of the terms is to being constant, the more accurate the result based upon Equation (12). Examples are set forth below but, as may be understood, other values may be used depending upon the desired accuracy of the payload estimation system 157.

In one example, acceptable results may be achieved if the velocity of the machine changes at no more than approximately 1.0 mile per hour per second. In other examples, it is believed that acceptable results may be achieved if the velocity changes by approximately 1.5 and possibly even 2.0 miles per hour per second. In other words, the maximum change in velocity (which is the acceleration of the machine 100) defines an acceleration threshold and the machine must be changing velocity at less than the acceleration threshold.

In one example with respect to the angle of inclination of the slope or grade on which the machine 100 is traveling, acceptable results may be achieved if the grade changes by no more than approximately 2 degrees per second. In other examples, it is believed that acceptable results may be achieved if the slope changes by approximately 3 degrees per second. In other words, the maximum rate of change of the angle of inclination of the machine 100 defines an inclination rate change threshold and the machine must be changing inclination at a rate less than the inclination rate change threshold.

As described above, in some applications that minimum slope may be at least approximately 6% but in other examples the minimum slope may be as low as approximately 4%. In other words, the minimum angle of inclination of the machine 100 defines an angle of inclination threshold and the machine must be traveling up an inclination that is greater than the angle of inclination threshold.

Figure 3:
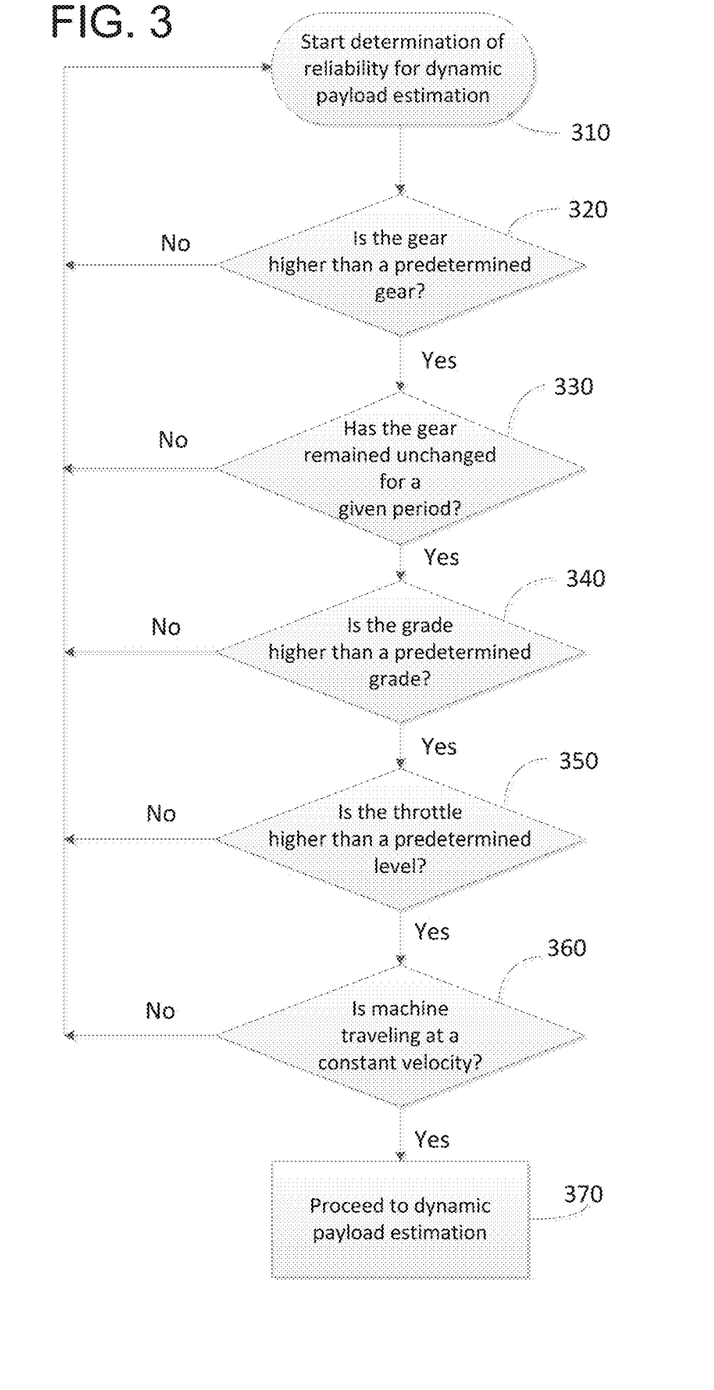
FIG. 3 is a flowchart of an exemplary process determining the reliability of a method of estimating the mass of a payload in accordance with the disclosure.
Figure 4:
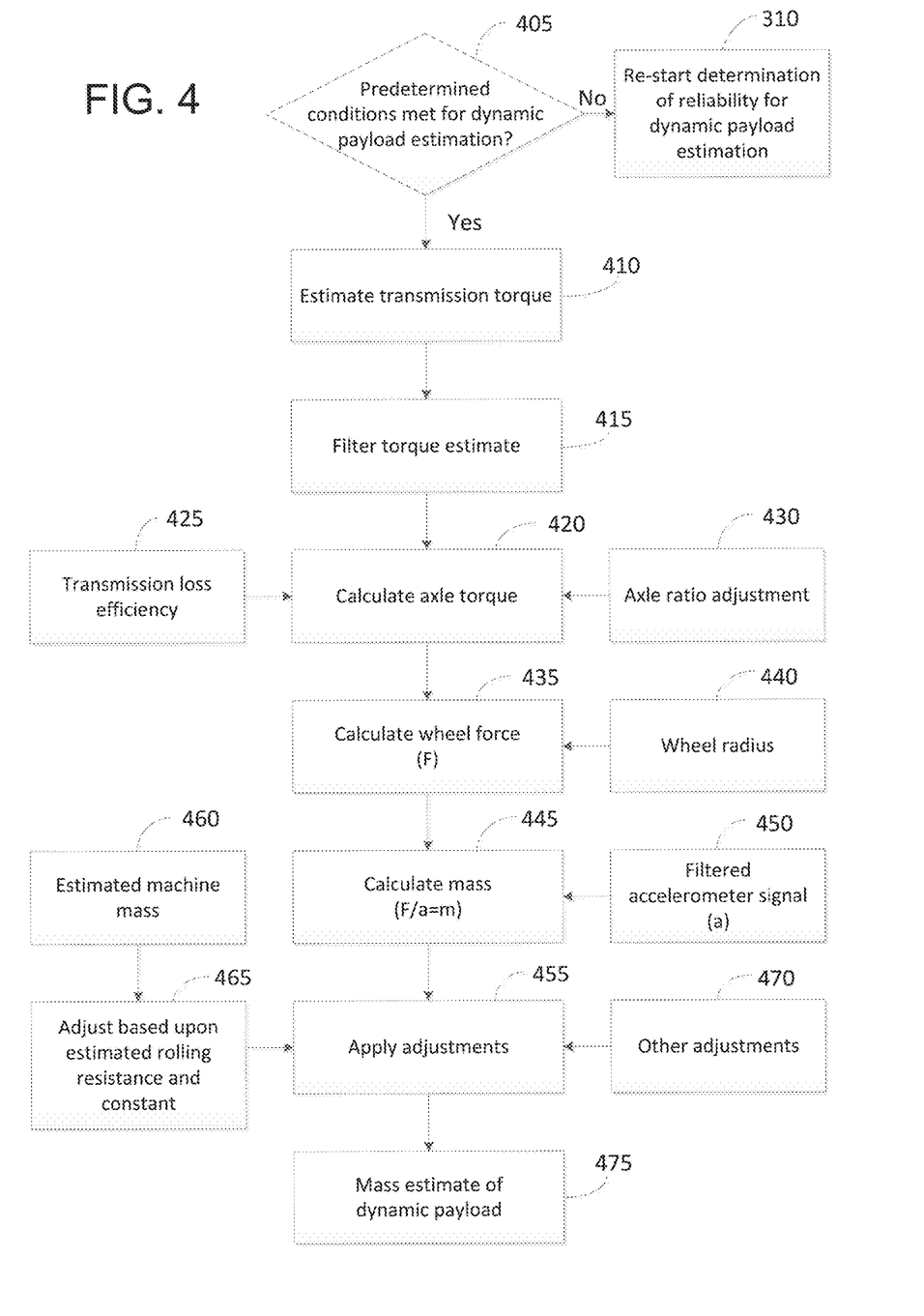
FIG. 4 is a flowchart of an exemplary process for estimating the mass of a payload of a hauling machine in accordance with the disclosure.

Referring to FIGS. 3 and 4, an exemplary process for determining an estimate of the mass of a dynamic payload 133 is illustrated. The process includes two aspects, that is, a determination as to whether appropriate conditions exist for the valid calculation of an estimated mass of a dynamic payload 133 (FIG. 3), and the calculation of the estimated mass (FIG. 4). While the various steps are illustrated and discussed in a particular order, those of skill will appreciate that the steps may be performed in an alternate order in order to arrive at the final dynamic payload estimate unless otherwise specifically noted. For example, while the strategy first illustrates the determination of whether conditions exist allowing for a valid calculation, followed by the actual calculation based upon various input, the strategy could likewise be executed by first performing the actual calculation, followed by a determination of whether the calculation is valid, or the strategies may be performed simultaneously.

As stated above, the payload estimation system 157 may be operative to only calculate the estimated mass of the payload 133 while the machine 100 is operating at a relatively high torque, at a relatively constant velocity, and at or near a relatively constant and sufficiently steep grade or slope. Referring to the flowchart illustrated in FIG. 3, the determination of the reliability of the dynamic payload 133 is initiated by any appropriate mechanism at stage 310.

At decision stage 320, the controller 156 may determines whether the transmission 126 is operating in a gear greater than a predetermined gear. In one example, the controller 156 may determine whether the transmission 126 is in second gear or higher. Further, in order to ensure that the gear operation is not a transient operation, the controller 156 may determine at decision stage 330 whether the transmission 126 has been in the specified operating gear for at least a given period. In one example, the time period may be at least five seconds. It is believed in some situations, the time period may be approximately 3.5 seconds or more. If either of these requirements is not satisfied, then estimation of the payload mass during dynamic conditions will not be considered reliable and the process may be re-started at stage 310.

Information regarding the operation of the transmission 126 may be provided by any appropriate mechanism. For example, in some embodiments, the controller 156 directs operation of the transmission 126, including the operating gear utilized, and may include the determination of the time in a given gear. Additionally or alternatively, sensors or the like associated with the transmission 126 may provide signals indicative of the operating gear as well as time in that gear.

The controller 156 may determine at decision stage 340 whether the machine 100 is operating on a grade that is higher than a predetermined grade. In one example, an appropriate predetermined grade may be 6%. It is believed that in some situations the minimum grade may be 4%. The grade may be determined by any appropriate mechanism. For example, a tilt sensor, inclinometer, or grade detector 150 may provide a signal indicative of the grade to the controller 156. Alternately, the grade may be calculated by any appropriate data, such as, for example, using a calculation based upon a signal from an accelerometer. An estimation of the payload mass during dynamic conditions will be reliable only if the machine 100 is operating on at least a given grade. Accordingly, if the grade is less than the minimum grade or the angle of inclination threshold, the process may be re-started at stage 310.

Further, the machine 100 must be operating with the throttle in a position higher than a predetermined level in order for the estimation to be reliable as depicted at decision stage 350. The throttle position may be determined by any appropriate mechanism. For example, a throttle position sensor may be provided, or the operator control for the throttle 136 may provide a signal indicative of the throttle position to the controller 156 from which the controller may compare the throttle position to the predetermined level in order to determine if the resultant estimation of the payload mass during dynamic conditions will be reliable. An appropriate throttle position may be, for example, at least 90% of full throttle. It is believed that in some situations other minimum throttle positions (e.g., greater than 75%) may be utilized. If the throttle position is not greater than the throttle position threshold, the process may be re-started at stage 310.

The controller 156 may determine at decision stage 360 whether the machine 100 is traveling at a constant velocity. If the velocity is not sufficiently constant, the process may be re-started at stage 310. If each of decision stages 310, 320, 330, 340, 350, and 360 are met, the payload estimation system 157 may calculate at stage 370 an estimate of the payload 133 as set forth in the flowcharts of FIGS. 4 and 7.

Referring to FIG. 4, a flowchart illustrates a process for calculating an estimated mass of a payload 133 during dynamic conditions wherein the machine 100 is operating in a relatively high torque situation, at or near a steady velocity, and at or near a steady and sufficient grade (i.e., as may be determined by the process set forth in FIG. 3). As identified by decision stage 405, the calculation will be reliable only if the operation of the machine 100 satisfies these predetermined conditions. If the conditions are not met at decision stage 405 have not been met, the payload calculation may be terminated and the analysis beginning at stage 310 (FIG. 3) repeated. While decision stage 405 is disposed at the beginning of the flowchart of FIG. 4, it may be disposed at any position or following the calculation of the estimated mass.

As indicated in stage 410, the output torque from the transmission 126 is estimated. The transmission output torque may be estimated or calculated by any appropriate method, device(s) or machine operating parameter values. In one example, a dynamic estimator may utilize an engine torque signal broadcast by an engine ECM. In another example, the engine torque may be determined based upon fuel consumption and engine speed.

The torque may be estimated based upon machine operating parameter values including reported engine torque, speed ratio (ratio of torque converter input to converter output), and engine speed. As indicated in stage 415, the estimated torque from the transmission 126 may be filtered, applying a filter constant based upon the particulars of the machine 100 in order to obtain a signal indicative of the transmission torque.

As indicated at stage 420, in order to calculate the torque applied at an axle 116 of wheel 112, the signal indicative of the transmission torque is multiplied by a force factor based upon transmission loss efficiency (stage 425), and an axle ratio adjustment 430. The axle ratio adjustment 430 may be based upon a gear ratio to the axle 116. To determine the force (F) applied at the wheel 112 (see stage 435), the torque applied at the axle 116 is divided by the radius 118 of the wheel 112 (see stage 440).

An accelerometer 144 disposed at the bed 130 of the machine 100 is provides a signal indicative of acceleration in the X direction at the bed 130, that is, in the fore and aft direction. A filter constant is utilized to filter the signal from the accelerometer 144 to provide a filtered accelerometer signal (see stage 445) indicative of acceleration (a).

The mass of the machine 100 including the payload 133 (stage 445) is calculated by dividing the drive force at the ground engaging elements 111 by the acceleration (a) based upon the filtered accelerometer signal (stage 450). Adjustments are made to the calculated mass of the machine 100 with payload 133 (stage 455) to account for the mass of the machine 100. An estimated unloaded mass of the unloaded machine 100 (stage 460) is adjusted based upon estimated rolling resistance of the machine 100 and prior mass calculations (stage 465) and subtracted from the estimated mass of the machine 100 including the payload 133 to provide an initial estimate of the mass of the dynamic payload 133. Other adjustments may likewise be made based upon specifics of the machine 100 and prior calculations of mass (stage 470) to provide the final estimate of the mass of the dynamic payload 133 at stage 475.

Figure 7:
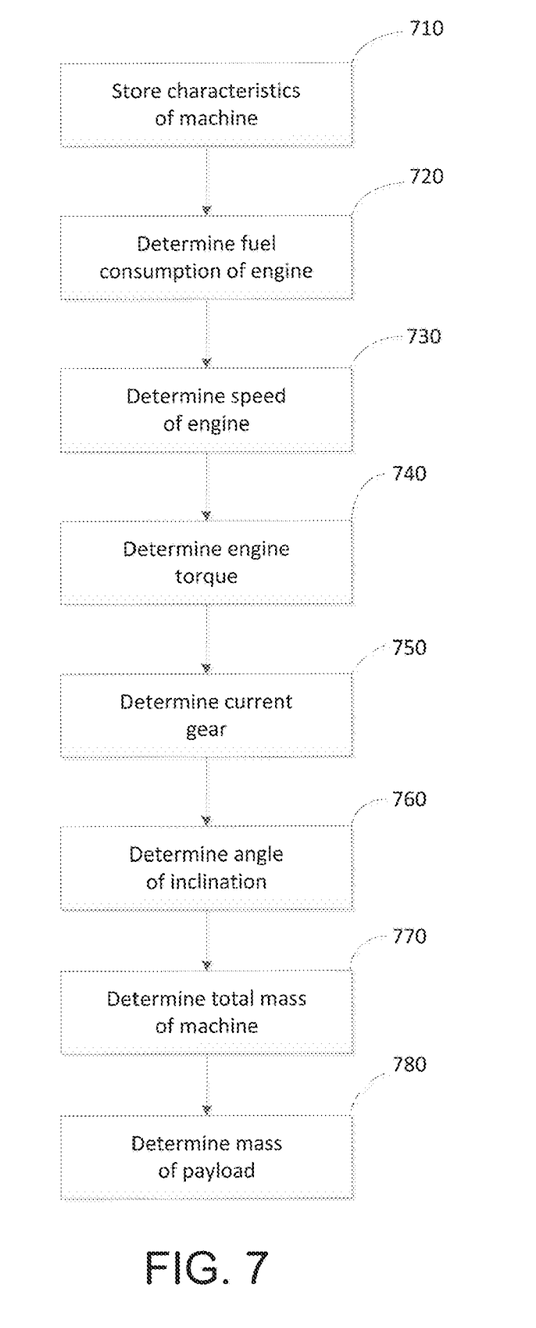
FIG. 7 is a flowchart of an alternative process for estimating the mass of a payload of a hauling machine.

In an alternate example set forth in FIG. 7, rather than utilizing stages 410-475 of FIG. 4, the controller 156 may solve Equation (12) to determine the mass ($m_{payload}$) of the payload 133. To do so, at stage 710, the characteristics of the machine 100 may be entered or stored within controller 156. These characteristics may include the mass ($m_{unloaded}$) of the unloaded machine 100, the radius of the ground engaging elements 111, engine torque $T_{engine}$ estimates based upon engine speed and fuel consumption, the transmission efficiency factor $\eta_{trans}$, the gear ratio factors $R_{trans}$ of each gear of the transmission 126, and the axle efficiency factor $\eta_{axle}$ and the gear ratio factor $R_{axle}$ of the axle 116.

At stage 720, the controller 156 may determine the fuel consumption of the engine 124 based upon sensors associated with the engine. At stage 730, the controller 156 may determine the engine speed based upon sensors associated with the engine 124. From the fuel consumption and engine speed and look up tables within the controller 156, the controller may determine at stage 740 the output torque from the engine 124.

At stage 750, the controller 156 may determine the current gear in which the machine 100 is operating. From the current gear, the gear ratio factor of the transmission 126 may be determined. The controller 156 may determine the angle of inclination θ at which the machine 100 is operating at stage 760. The controller 156 may do so based upon grade detector 150 or in any other desired manner such as based upon readings from the accelerometer.

The controller 156 may determine at stage 770 the total mass (m) of the machine 100. To do so, the controller 156 may utilize Equation (11). For greater accuracy, Equation (10) may be used, if desired. At stage 780, the mass ($m_{payload}$) of the payload 133 may be determined by subtracting the unloaded mass ($m_{unloaded}$) of the machine 100 in an unloaded condition (stored at stage 710) from the total mass of the machine (determined at stage 770) as shown in Equation (12).

Figure 5:
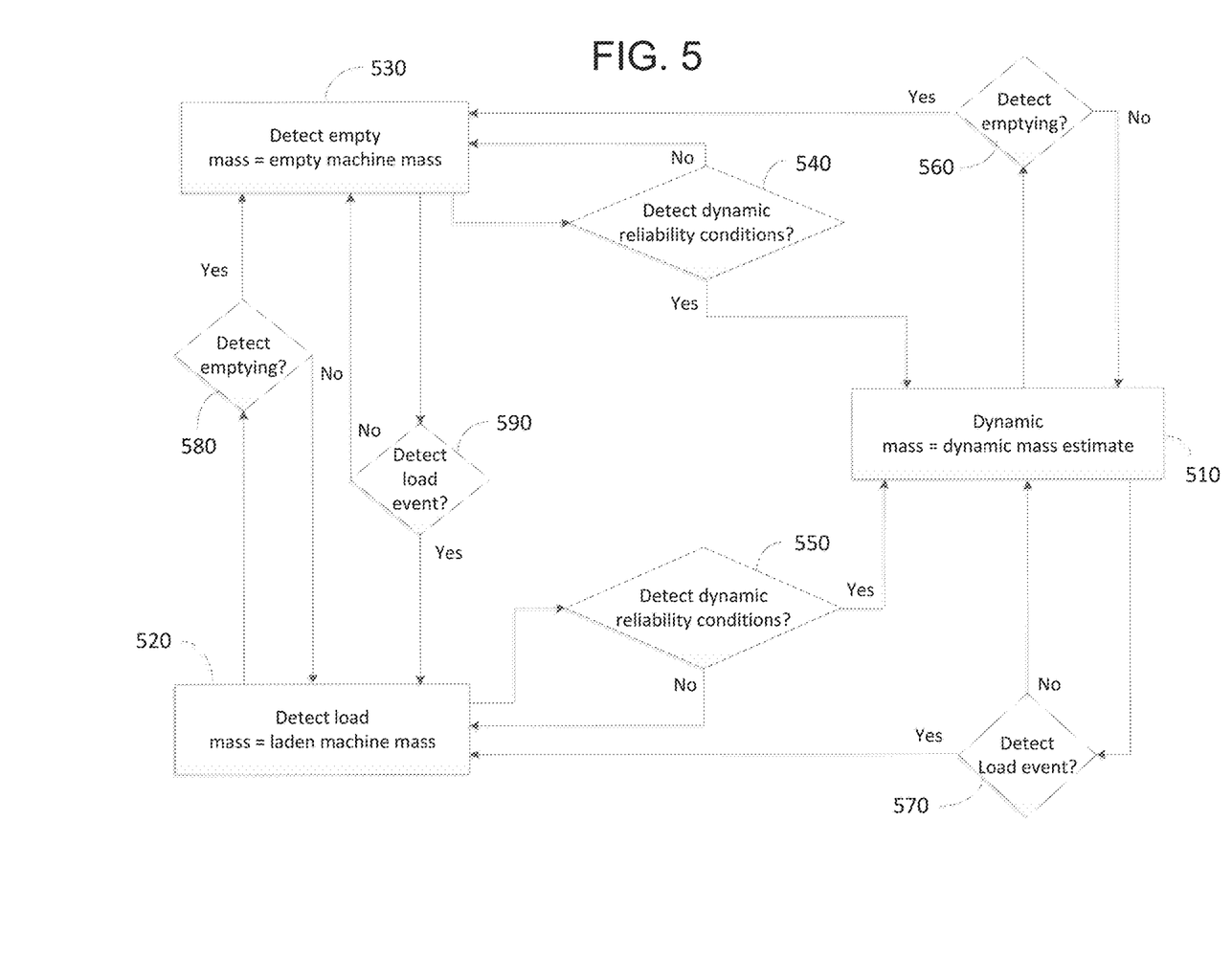
FIG. 5 is a flowchart of an exemplary process for determining the mass of a payload of a hauling machine incorporating the methods of FIGS. 3 and 4.

The process for estimating the dynamic mass of a payload 133 of machine 100 may be a part of a larger process or integration algorithm for estimating the mass of the payload of machine 100. Referring to FIG. 5, an exemplary integration process is depicted for the estimation of the mass of payload 133 during various conditions. The process may include a strategy (stage 510) for determining a dynamic mass estimate, along with a strategy (stage 520) related to a loading event, and a strategy (stage 530) related to an emptying event. In this way, while the machine 100 is operating, the programmable controller 156 may monitor various functions and parameters of the machine 100 and the environment to determine what, if any, mass determination is appropriate. The calculated, estimated mass of the payload 133 may be utilized in algorithms for continued operations related to the machine 100.

Knowledge of the mass of the payload 133 may be particularly useful for adjusting the operation of aspects of machine 100 since the payload may increase the total mass of the machine by more than 100%. In other words, the fully loaded machine 100 may weigh more than twice as much as an unloaded machine. Under some circumstance, it may be desirable to change aspects of the operation of the machine based upon the extent to which the machine is loaded. For example, the estimated mass of payload 133 may be utilized to adjust transmission shift points and adjust or retard the timing of the engine 124. In addition, the estimated mass may be used by other systems of the machine 100 such as an anti-lock braking system.

The controller 156 may be configured to automatically determine an estimate of the payload 133 after the completion of either a loading event of the bed 130 or an emptying event of the bed 130. In addition, the controller 156 may be further configured to reset the estimate of the payload upon completion of either of a loading event or emptying event. In other words, the payload estimation system 157 may be operative to automatically determine an estimate of the payload 133 each time a loading or unloading event occurs. The controller 156 may use the estimate of the payload 133 until the next loading or emptying event. Upon the next emptying event, the controller 156 may reset the estimate and await a new estimate from the payload estimation system 157.

A strategy 510 for determining the mass of payload 133 during dynamic conditions may be utilized to estimate the mass if it is detected at either decision stage 540 or decision stage 550 that the conditions exist for reliably determining a dynamic mass estimate. A process such as is illustrated in FIG. 3 may be utilized at decision stages 540 and 550 to detect and determine if conditions exist to reliably estimate a dynamic mass. Likewise, processes such as those illustrated in FIGS. 4 and 7 may be utilized to calculate the dynamic mass of a payload 133 (see stage 510).

From the determination of a dynamic mass estimate (stage 510), if emptying of the bed 130 is detected (decision stage 560), the strategy 530 directed to an emptying event may be applied to determine whether the bed 130 is empty (i.e., there is no payload 133 contained in the bed 130). Conversely, if a loading event is detected (decision stage 570), the strategy 520 directed to a loading event may be applied to determine if a loading event is occurring.

Similarly, from the determination of a loading event by the strategy 520, if the conditions are detected for the reliable determination of a dynamic mass estimate (decision stage 550), then the strategy 510 for the determination of the mass under dynamic conditions may be applied. Conversely, if an emptying event is detected (decision stage 580), the strategy 530 directed to an emptying event may be applied to determine whether the bed 130 is empty.

Finally, from the determination of an emptying event by the strategy 530, if the conditions are detected for the reliable determination of a dynamic mass estimate (decision stage 540), then the strategy 510 for the determination of the mass under dynamic conditions may be applied. Again, conversely, if a load event is detected (decision stage 590), the strategy 520 directed to a loading event may be applied to determine if a loading event is occurring.

Figure 6:
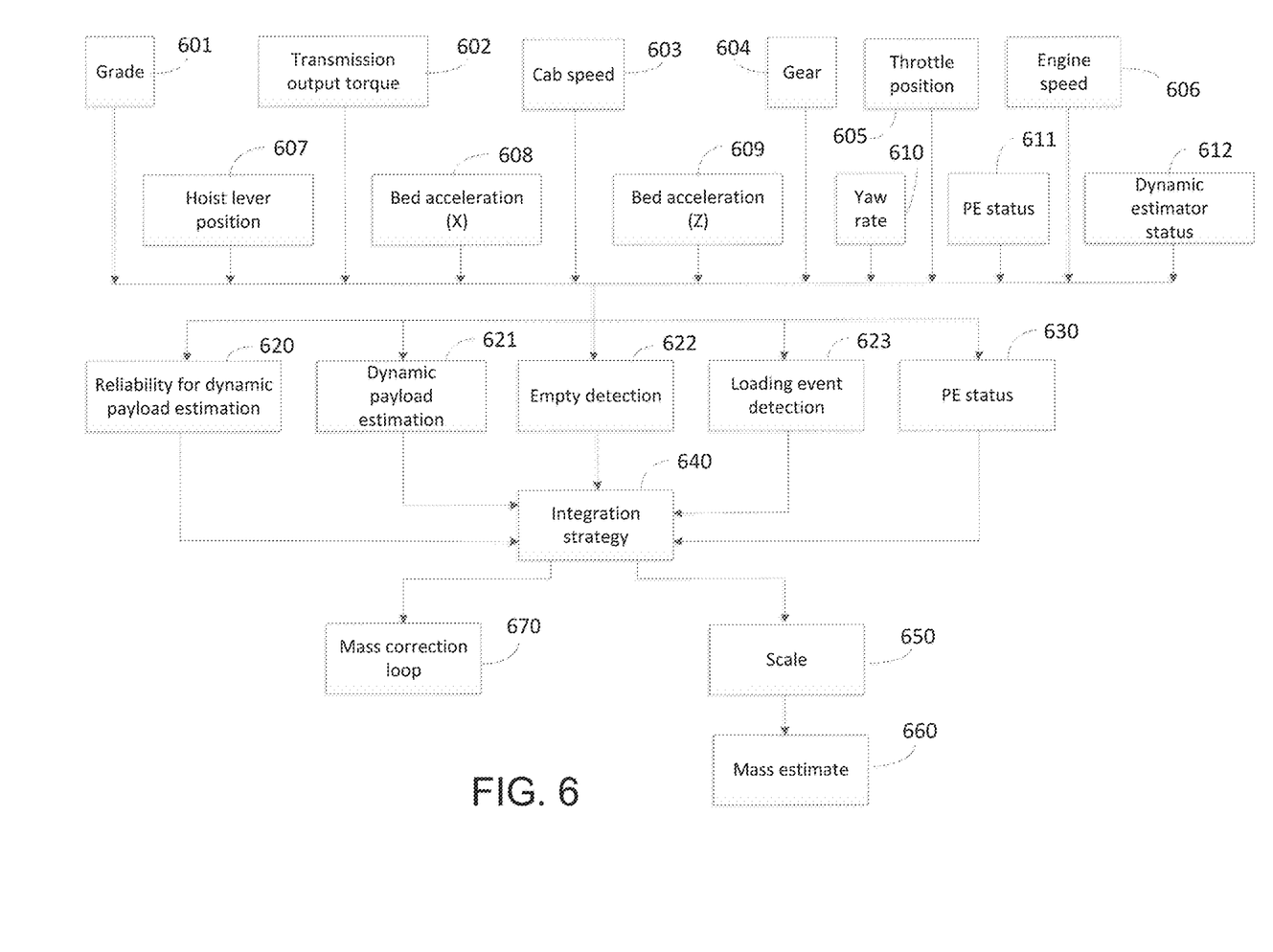
FIG. 6 is a flowchart of an exemplary process for determining the mass of a payload of a hauling machine incorporating the methods of FIGS. 3-5.

The process of FIG. 5 is shown the context of the larger context of a top-level algorithm in FIG. 6. Information may be provided from various sources, such as, for example, those illustrated in FIG. 2. By way of example only, information may be provided regarding the grade (stage 601) from the grade detector 150, transmission output torque (stage 602) based upon calculations or information from the transmission 126, cab speed (stage 603) from the cab speed sensor 140, gear (stage 604) based upon the operator transmission gear control 138, throttle position (stage 605) based upon a sensor or the operator control device for the throttle 136, engine speed (stage 606) based upon the engine speed sensor 142, hoist lever position (stage 607) based upon a sensor or the operator hoist control 134, bed acceleration in the X and Z directions (stages 608 and 609) based upon accelerometers 144, 145, and the yaw rate (stage 610) based upon a yaw sensor 146. Further, in an embodiment, any appropriate mechanism may be utilized to provide an indication of whether sensors and other devices providing information are in working condition (see, for example, PC status 611 and dynamic estimator status 612).

From the information provided, individual stages 620-623 may be applied for determining the reliability of a dynamic payload mass estimation, estimating a dynamic payload mass, emptying detection, and loading event detection. Again, an embodiment may further include any appropriate mechanism for providing an indication that all individual strategies are proceeding (stage 630). From the operation of the individual stages 620-623 along with the integration strategy (stage 640) such as the process illustrated in FIG. 5, an estimated mass is determined. The estimated mass is then scaled (stage 640) for delivery to a data link module (not illustrated) to provide a broadcast mass estimate (stage 650).

Further, the estimated mass obtained may be utilized in the additional algorithms, as indicated by stage 670, the mass correction loop. For example, an estimated mass of the machine 100 and payload 133 may be utilized in calculations and estimates related to the rolling resistance of the machine 100, as utilized in stages 460 and 465 in the process illustrated in FIG. 4.

INDUSTRIAL APPLICABILITY

The present disclosure is applicable to machines 100 including a bed 130 for carrying a payload 133. Embodiments of the disclosed processes may have the ability to estimate payload mass without the use of any other weight sensors.

Some embodiments may take into account appropriate losses for one or more of the factors utilized to calculate an estimated force ground engaging elements 111.

The process for calculating the mass of a dynamic payload 133 may be utilized at opportune times when the calculation will be most accurate.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for estimating a payload in a bed of a machine, the system comprising:
   a torque sensor for determining an output torque from a prime mover;
   a grade detector for determining an angle of inclination of the machine;
   a sensor for determining machine acceleration; and
   a controller configured to:
     store an angle of inclination threshold;
     store an inclination rate of change threshold;
     store an acceleration threshold;
     store an unloaded mass of the machine in an unloaded condition;
     determine the output torque from the prime mover;
     determine the angle of inclination of the machine based upon signals from the grade detector;
     compare the angle of inclination of the machine to the angle of inclination threshold;
     generate commands to drive the machine on a work surface wherein, when driving the machine, the angle of inclination of the machine is greater than the angle of inclination threshold;
     determine a rate of change in the angle of inclination;
     compare the rate of change in the angle of inclination to the inclination rate of change threshold;
     generate commands to drive the machine on a work surface wherein, when driving the machine, the rate of change in the angle of inclination is less than the inclination rate of change threshold;
     determine the machine acceleration;
     compare the machine acceleration to the acceleration threshold;
     generate commands to drive the machine on a work surface wherein, when driving the machine, the machine acceleration is less than the acceleration threshold; and
     determine an estimate of the payload in the bed based on the output torque from the prime mover, the angle of inclination of the machine, and the unloaded mass while:
       the angle of inclination of the machine is greater than the angle of inclination threshold;
       the rate of change in the angle of inclination is less than the inclination rate of change threshold; and
       the machine acceleration is less than the acceleration threshold.

2. The system of claim 1, wherein the controller is configured to determine the estimate of the payload without determining a change in inertia and a change of momentum.

3. The system of claim 1, wherein the controller is further configured to automatically determine the estimate of the payload after completion of one of a loading event of the bed and an emptying event of the bed.

4. The system of claim 3, therein the controller is further configured to reset the estimate of the payload upon completion of one of the loading event of the bed and the emptying event of the bed.

5. The system of claim 1, wherein the controller is further configured to control an operation of the machine while the machine is moving based upon the estimate of the payload.

6. The system of claim 5, wherein the operation controlled by the controller includes at least one transmission shift point.

7. The system of claim 5, wherein the operation controlled by the controller includes adjusting timing of the prime mover.

8. The system of claim 1, further including a transmission and wherein the controller is further configured to determine if the transmission is at a gear higher than a predetermined gear.

9. The system of claim 1, further including a transmission including a gear and wherein the controller is further configured to determine if the gear has not been changed within a predetermined period of time.

10. The system of claim 1, further including a throttle position sensor for determining a position of a throttle, and the controller is further configured to:
    store a throttle position threshold;
    determine the throttle position;
    compare the position of the throttle to the throttle position threshold; and
    determine the estimate of the payload in the bed when the throttle position is greater than the throttle position threshold.

11. The system of claim 1, wherein the angle of inclination threshold is a grade of approximately 4%.

12. The system of claim 11, wherein the acceleration threshold is approximately 2.0 miles per hour per second.

13. The system of claim 12, wherein the inclination rate of change threshold is approximately 3 degrees per second.

14. A method of estimating a payload in a bed of a machine, the method comprising:
    storing an angle of inclination threshold;
    storing an inclination rate of change threshold;
    storing an acceleration threshold;
    storing an unloaded mass of the machine in an unloaded condition;
    determining an output torque from a prime mover;
    determining an angle of inclination of the machine based upon signals from a grade detector;
    comparing the angle of inclination of the machine to the angle of inclination threshold;

driving the machine on a work surface wherein, when driving the machine, the angle of inclination of the machine is greater than the angle of inclination threshold;

determining a rate of change in the angle of inclination;

comparing the rate of change in the angle of inclination to the inclination rate of change threshold;

driving the machine on a work surface wherein, when driving the machine, the rate of change in the angle of inclination is less than the inclination rate of change threshold;

determining a rate of machine acceleration;

comparing the rate of machine acceleration to the acceleration threshold; and driving the machine on a work surface wherein, when driving the machine, the machine acceleration is less than the acceleration threshold; and determining an estimate of the payload in the bed based on the output torque from the prime mover, the angle of inclination of the machine, and the unloaded mass while:

the angle of inclination of the machine is greater than the angle of inclination threshold;

the rate of change in the angle of inclination is less than the inclination rate of change threshold; and the machine acceleration is less than the acceleration threshold.

15. The method of claim 14, including determining the estimate of the payload without determining a change in inertia and a change of momentum.

16. The method of claim 14, including automatically determining the estimate of the payload upon completion of one of a loading event of the bed and an emptying event of the bed.

17. The method of claim 16, including resetting the estimate of the payload upon completion of one of the loading event of the bed and the emptying event of the bed.

18. The method of claim 14, including controlling an operation of the machine while the machine is moving based upon the estimate of the payload.

19. The method of claim 14, including determining if a gear of a transmission has not been changed within a predetermined period of time.

20. A hauling machine comprising a plurality of ground engaging elements;

a prime mover operatively connected to the plurality of ground engaging elements;

a bed adapted to carry a payload;

a transmission operatively connected to the prime mover and the plurality of ground engaging elements and adapted to operate in a plurality of gears;

a torque sensor for determining an output torque from the prime mover;

a grade detector for determining an angle of inclination of the hauling machine;

a sensor for determining machine acceleration; and a controller configured to:

store an angle of inclination threshold;

store an inclination rate of change threshold;

store an acceleration threshold;

store an unloaded mass of the hauling machine in an unloaded condition;

determine the output torque from the prime mover;

determine the angle of inclination of the hauling machine based upon signals from the grade detector;

compare the angle of inclination of the hauling machine to the angle of inclination threshold;

determine a rate of change in the angle of inclination;

compare the rate of change in the angle of inclination to the inclination rate of change threshold;

determine the machine acceleration;

compare the machine acceleration to the acceleration threshold; and only if:

a) the angle of inclination of the hauling machine is greater than the angle of inclination threshold;

b) the rate of change in the angle of inclination is less than the inclination rate of change threshold; and c) the machine acceleration is less than the acceleration threshold, determine an estimate of the payload in the bed based upon the output torque from the prime mover, the angle of inclination of the machine, and the unloaded mass.

* * * * *